Aug. 21, 1962 A. F. REILLY 3,050,414
COATED FOAM SCOURING PAD
Filed May 27, 1960
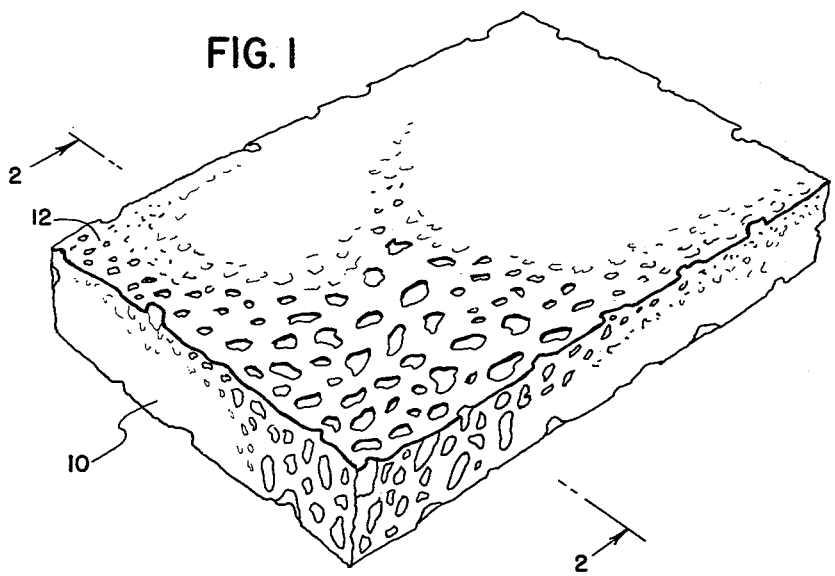
*INVENTOR.*
ALBERT F. REILLY
BY
*ATTORNEY*

3,050,414
COATED FOAM SCOURING PAD
Albert F. Reilly, Clarence, N.Y., assignor to General
  Mills, Inc., a corporation of Delaware
Filed May 27, 1960, Ser. No. 32,319
6 Claims. (Cl. 117—98)

The present invention relates to improvements in scouring pads. More particularly, it pertains to scouring pads comprised of a flexible, resilient foam body with a frangible coating on a surface thereof.

Some scouring pads currently in use are made from metallic wool or inorganic abrasive grains. A disadvantage of such pads is that they tend to scratch metal or ceramic surfaces.

Accordingly, one object of this invention is to provide a scouring pad which will not tend to scratch metal or ceramic surfaces.

A further object of this invention is to provide a scouring pad having an abrasive surface which will not readily wear away.

Another object is to provide a scouring pad which will not become matted and from which food particles can be readily rinsed out after use.

Other objects and advantages in the invention will be apparent from the following description in which certain preferred embodiments of the invention are disclosed.

According to the present invention the desired objects can be accomplished by coating one surface of a flexible, resilient foam body with a frangible organic coating. This frangible coating is sufficiently brittle so that bending of the foam body will tend to crack said coating in many places. These cracks form sharp cutting edges which provide scouring action but said cutting edges are composed of an organic material which is not abrasive so that the scouring pad will not scratch metal or ceramic surfaces.

In the drawings which form part of this application,

FIGURE 1 is a perspective view of a scouring pad made in accordance with the present invention; and FIGURE 2 is a sectional view through the line 2—2 of FIGURE 1.

The scouring pad shown in FIGURE 1 includes a flexible, resilient foam body 10 with a frangible organic coating 12 secured to its upper surface. In the preferred embodiment the foam body 10 is a coarse porosity polyurethane foam. The foam body could also be of either fine or mixed porosity. While reference is made herein specifically to polyurethane foams, it is to be understood that any flexible resilient foam body such as a cellulose foam, foam rubber or the like may be used provided said body 10 is a flexible, resilient type of foam like material. The term flexible is meant to include semi-rigid type bodies which can be bent or flexed in such a way that the coating 12 can be cracked or shattered in many places.

In the preferred embodiment the polyurethane foam body 10, as is well known in the art, is derived from a polyester reaction product of adipic acid and diethylene glycol having an acid number between about 0 and 20 and a hydroxyl number between about 20 and 100, the reaction product being mixed with a mixture of toluene diisocyanate 2,4 and 2,6, a small amount of water and a tertiary amine catalyst. By way of exmple, the following formulations may be used to form various porosity polyurethane foams:

|  | Parts by Weight | | |
|---|---|---|---|
|  | Fine Pore | Coarse Pore | Mixed Pore |
| Polyester resin | 100 | 100 | 100 |
| Toluene diisocyanate mixture of approximately 80%, 2,4, and 20%, 2,6 | 40.2 | 40 | 40 |
| N-Methylmorpholine | 1.2 | 1.2 | 1.2 |
| Witco 77-86 | 2.3 | 2.3 | 2.3 |
| Tricresyl phosphate | 3.4 | 3.4 | 3.4 |
| Water | 3.5 | 3.5 | 3.5 |
| Anti static agent |  | .4 |  |
| Glycerol |  |  | 1.25 |

The frangible organic coating 12 can be provided by a number of products such as epoxy resins, phenolics, urethanes and acrylics. For the purposes of illustration, specific reference will be made herein to a frangible coating of a cured epoxy resin. However, any frangible coating of phenolic, urethane or acrylic resins may be used.

In the preferred embodiment the frangible organic coating 12 is an epoxy resin cured with a flexibilizing modifier. The preferred epoxy resins are the liquid epoxy resins which are the reaction products of bisphenol A and epichlorohydrin, a wide variety of which are available commercially. The preferred flexibilizing modifier is an amino imidazoline which is also available commercially and is the reaction product of an alkylene polyamine and polymeric fat acids. In general three parts of the epoxy resin are used with one part of the amino imidazoline.

Any epoxy resin which will provide a frangible organic coating may be used in this invention. Such epoxy materials are of a wide variety. In general they contain a plurality of epoxy groups capable of reaction with a curing agent. The typical commercially available epoxy materials are complex reaction products of polyhydric phenols with polyfunctional halohydrins. A large number of this type of epoxy resins are disclosed in Greenlee Patents 2,585,115 and 2,589,245.

Typical polyhydric phenols useful in the preparation of epoxy resins include resorcinol, novolac resins, and various bisphenols resulting from the condensaton of phenol with aldehyde and ketones such as formaldehyde, acetaldehyde, acetone, methyl ethyl ketone and the like. A typical epoxy resin is the reaction product of epichlorohydrin and 2,2-bis (p-hydroxy phenyl) propane (bisphenol A), the resin having the following theoretical structural formula,

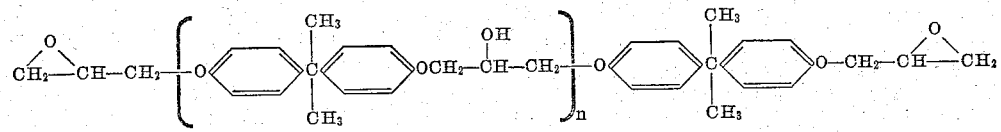

In the preferred embodiment the polyurethane foam body 10, as is well known in the art, is derived from where n is 0 or an integer up to 10. Generally speaking n will be no greater than 2 or 3 and is preferably 1 or less. Those prepared from the novolac resins and epichlorohydrin have the structural formula,

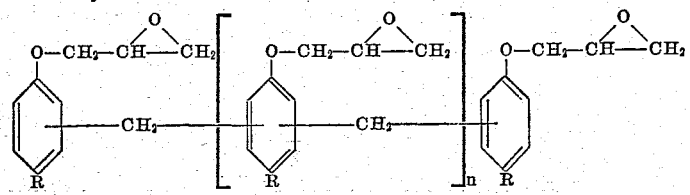

in which R is a hydrogen or an alkyl radical having from 1 to 4 carbon atoms and $n$ is an integer from 1 to 8.

Epoxy resins may be characterized further by reference to their epoxy equivalent weight, the epoxy equivalent weight of pure epoxy resins being the mean molecular weight of the resin divided by the mean number of epoxy radicals per molecule, or in any case the number of grams of epoxy resin equivalent to one epoxy group or one gram equivalent of epoxide. While certain specific epoxy resins which are the most readily available commercially have been described, it is understood that the epoxy resinous compositions encompassed by this invention are those liquid epoxy resins having an epoxy equivalent weight of 140 to 300, the preferred epoxy equivalent weight being 185 to 220, expressed in terms of grams of compound per epoxy group. A number of commercially available epoxy resins have the above characteristics.

The normally liquid epoxy resins must be converted to a solid end product in order to provide the desired frangible coating 12 for the foam body 10. This is called curing and can be accomplished in known manner by the use of catalysts and/or reactive hardeners. These catalysts and/or reactive hardeners are usually referred to as curing agents. Certain types of curing agents are called flexibilizing modifiers. Curing agents which may be employed in the present invention can be either nitrogen containing or acid type curing agents. Specific examples of nitrogen containing curing agents that may be employed with the present invention are amino-monoamide, amino-polyamide, amino-imidazoline, imino-linked polyamide-polyimidazoline, aliphatic and aromatic amides and polyamides.

Specific examples of acid type curing agents that may be employed with the present invention are polybasic acids and anhydrides such as phthalic, chlorendic, pyromellitic or dodecenyl succinic anhydride. It should be understood that the above list of curing agents are merely illustrative and should not be construed as limiting the present invention in any way. That is, any curing agent which will convert the liquid epoxy resin to a frangible coating that will adhere to a flexible, resilient foam body can be used in carrying out the present invention.

In general the curing agents mentioned above are combined in the following proportions: one hundred (100) parts by weight of epoxy resin with from five (5) to thirty (30) parts by weight of curing agent. In addition, one could use combinations of said curing agents as is well known in the art.

The preferred curing agent for this particular invention which is a flexibilizing modifier is an amino-containing compound known as an amino-imidazoline. Other amino-containing compounds such as amino-amides, amino-polyamides, and imino-linked polyamide-polyimidazolines having relatively high amine numbers can also be used to cure the epoxy resin. The amine number referred to herein is the number of milligrams of potassium hydroxide equivalent to the amine groups in one gram of product. The amine number thereby indicates the amine groups available for reaction and serves as an indication of the structure and usefulness of the compound. The amine number is therefore one of the chief characteristics of such compounds. In general, the amino compounds suitable for this invention have amine numbers in the range of 50 to 700.

The amino compounds are derived by the reaction of a polyamine with either a fatty acid, polymeric fat acid, or an epoxidized fatty acid or the esters thereof which results in an amino compound having unreacted amino groups. The polyamines which may be employed in preparing the amino containing compounds are the alkylene polyamines such as ethylene diamine, diethylene triamine, tetraethylene pentamine, di-1,3-propane triamine, di-1,2-propane triamine, and the like. The polyamines can be represented by the formula $H_2N(RNH)_nH$ where R is an alklene radical and $n$ is an integer from 2 to 6. While the alkylene radical is generally ethylene, alkylene radicals having up to 6 carbon atoms are suitable.

The amino-polyamides which may be employed in this invention are those derived by reacting an excess of the previously mentioned polyamines with polymeric fat acid. The amidification reaction may be carried out under the usual conditions employed for this purpose. Generally this involves reaction at about 200° for approximately 3 hours. The polyamides derived from diethylene triamine generally have a lower amine number in the range of 50 to 200. If longer chain polyamines are employed the amine number will be correspondingly higher.

The amino-imidazolines which are employed in this invention are prepared in an analogous manner. The ethylene polyamines are used to form the imidazoline ring. The reaction is carried out under the usual conditions employed for imidazoline formation which generally involves heating to about 280° to 315° C. for approximately 2 to 3 hours. Any amino-polyamide formation will generally be converted to imidazoline form at this temperature.

The polymeric fat acids which may be employed in preparing the amino-polyamides and amino-imidazolines are those resulting from the polymerization of drying or semidrying oils or the free acids or the simple aliphatic alcohol esters of these acids, for example, resources rich in linoleic acid. Suitable drying or semidrying oils include soybean, linseed, tung, perilla, cottonseed, corn, sunflower, safflower and dehydrated castor oil. Suitable fatty acids may also be obtained from tall oil, soap stock and other similar materials. In the polymerization process for the preparation of a polymeric fat acid the unsaturated fatty acids combine to provide a mixture of dibasic and higher polymeric fat acids. These acids are often referred to as dimers, trimers and so forth. In place of this method of polymerization any other method of polymerization may be employed whether the resultant polymer possesses residual unsaturation or not. The term "polymeric fat acid" as used herein is intended to include the polymerized mixture of acids which usually contain a predominant portion of dimer acids, a small quantity of trimer and higher polymeric fat acids and some residual monomer.

At the present time the most readily available naturally occurring polyunsaturated acid available in large quantities is linoleic acid. Accordingly, it should be appreciated that polymeric fat acids will as a practical matter result from fatty acid mixtures that contain a preponderance of linoleic acid. It should also be appreciated that since linoleic acid occurs in nature as a complex mixture in every instance it is available in various degrees of purity ranging from relatively expensive pure linoleic acid that has been laboriously purified to crude sources such as tall oil and soap stock which contains substances other than fatty acids. One method of obtaining the linoleic rich fatty acids is by separating a major portion of the oleic and saturated fatty acids from any convenient and economical source of fatty acids having a high iodine value. In addition dimeric and polymeric fat acids can be prepared from fatty acid compositions rich in oleic acid by a catalyzed polymerization. Such dimeric and polymeric fat acids may be used in this invention. Furthermore, polymeric fat acids are readily available commercial products.

The amino-monoamides which may be employed in this invention are the products of the reaction of the previously mentioned alkylene polyamines and fatty acids having from 8 to 22 carbon atoms. The amidification reaction may be carried out under the usual conditions employed for this purpose, which involves reaction at about 170° C. for approximately 2 hours. In general the same acids which are used to prepare the polymeric fat acids are suitable. Suitable fatty acids are also obtained from tall oil. In addition such fatty acids are readily available commercial products. One such product is the tall oil fatty acids sold by Hercules Powder Company under the name of "Pamak."

If the epoxidized fatty acids or their alkyl esters are employed complex amino-containing imino-linked-polyamide-polyimidazolines result. The alkyl esters which can be used in preparing the complex product used in this invention are generally those having an alkyl group having from 1 to 6 carbon atoms. The reaction with the polyamine may be carried out in several ways. One preferred method is to carry out the reaction at about 150° C., at which temperature both imidazoline and amide linkages result. Another method is to carry out the reaction at about 100° C., in which case the formation of amide linkages are favored, or at 200° C., and above at which temperatures imidazoline linkages are favored. In general, temperatures in excess of 300° C. should be avoided as deleterious side effects may result. The product will have an amine number in the range of from 50 to 700.

The epoxy fatty acid compounds, i.e., fatty acid esters and fatty acids employed may be prepared in any of the known methods. One method is to react any of the various unsaturated fatty acids mentioned previously or their esters with peracetic acid at about room temperature. The peracetic acid may be preformed before the epoxidation step or formed in situ by any one of the well known processes involving sulfonic acid resins utilizing hydrogen peroxide and acetic acid. Epoxidation can also be performed by the use of formic acid and hydrogen peroxide. The epoxides can also be prepared by addition of hypochlorous acid to the carbon-carbon double bond followed by dehydrochlorination.

In carrying out the present invention an epoxy resin of bisphenol A and epichlorohydrin having an epoxy equivalent weight of about 200 and an amino imidazoline of the polymeric fat acids and triethylene tetramine having an amine number of about 375 are mixed in a 3:1 ratio at room temperature. This mixture has a pot life of approximately 60 minutes. This mixture has a viscosity of 15,000 centipoises ±2500 centipoises and is roll coated, as is well known in coating art, onto a surface of the foam body 10. In the preferred embodiment the 3:1 mixture is applied in amounts of .05 to 1 gram per square inch. The mixture can be applied in amounts of .01 to 2 grams per square inch. The preferred mixture gels in about two hours at room temperature. At this point, the cure is not complete, but the material can be handled. The cure continues and under normal conditions it is complete at the end of four days. If elevated temperatures are used the cure time can be shortened as shown below:

| Temperature (° F.): | Cure Time (Min.) |
|---|---|
| 300 | 20 |
| 250 | 45 |
| 200 | 80 |
| 150 | 180 |

In view of the principles set forth herein, I have shown some of the ways of carrying out the present invention and some of the equivalents which are suggested by these disclosures.

What is claimed is:

1. A scouring pad comprising a flexible, resilient foam body having a frangible organic coating covering at least a portion of one surface thereof.

2. A scouring pad as set forth in claim 1 in which said frangible coating is selected from the group consisting of an epoxy, a phenolic, a urethane, and an acrylic resin coating.

3. A scouring pad as set forth in claim 1 in which said frangible coating comprises a cured epoxy resin.

4. A scouring pad set forth in claim 3 in which said frangible coating is cured with a nitrogen-containing curing agent.

5. A scouring pad as set forth in claim 1 in which said frangible coating comprises a fluid epoxy resin cured with an amino compound selected from the group consisting of amino-amides, amino-polyamides, amino-imidazolines, and imino-linked polyamide-polyimidazolines.

6. A scouring pad comprising a flexible, resilient polyurethane foam body having a frangible organic coating secured to at least a portion of one surface thereof, said coating being a mixture of three parts by weight of epoxy resin and one part by weight of an amino-imidazoline.

References Cited in the file of this patent

UNITED STATES PATENTS

| 2,906,643 | Dennis | Sept. 29, 1959 |
| 2,955,056 | Knox | Oct. 4, 1960 |

UNITED STATES PATENT OFFICE
CERTIFICATE OF CORRECTION

Patent No. 3,050,414                                  August 21, 1962

Albert F. Reilly

It is hereby certified that error appears in the above numbered patent requiring correction and that the said Letters Patent should read as corrected below.

Column 3, line 43, for "amides and polyamides" read -- amines and polyamines --; column 4, line 19, for "alklene" read -- alkylene --.

Signed and sealed this 1st day of January 1963.

(SEAL)
Attest:

ERNEST W. SWIDER                             DAVID L. LADD
Attesting Officer                                  Commissioner of Patents